US005971402A

United States Patent [19]

Northrop et al.

[11] Patent Number: 5,971,402

[45] Date of Patent: Oct. 26, 1999

[54] ULTRA-PURE, NON-REACTIVE, ELEVATED-TEMPERATURE SEAL ASSEMBLY

[75] Inventors: Clay W. Northrop, Salt Lake City; Michael R. Dunn, Sandy, both of Utah

[73] Assignee: Trebor International, Inc., West Jordan, Utah

[21] Appl. No.: 08/961,954

[22] Filed: Oct. 31, 1997

[51] Int. Cl.[6] .......... F16J 15/16

[52] U.S. Cl. .......... 277/611; 277/608; 277/627; 277/650

[58] Field of Search .......... 277/608, 611, 277/627, 628, 650, 946, 915; 392/489, 331, 325; 219/546; 285/911, 125.1

*Primary Examiner*—Anthony Knight
*Attorney, Agent, or Firm*—Madson & Metcalf

[57] ABSTRACT

Sealing assemblies are illustrated for heaters, pumps, conduits, and the like for handling process fluids used in the semiconductor-processing industry. Clean, particle-free, nonreactive, non-trapping, ultra-pure, thermally tolerant, sealed systems are required to maintain process fluids with contaminant levels below parts per billion, or even trillion. A lip seal connects a tube, having a lip at each end, to a face of a creeping material. A creeping fluorocarbon sealing material may form the interface for reducing stress concentrations on the tube, and for providing a consistent reliable seal between the lip and the creeping face. A face seal between creeping faces may be effected by a creeping sealant there between. The faces may be loaded entirely by their own creeping structural materials. No flanges are required. In certain embodiments, retaining rings may be provided for preventing unrestrained creep of sealing assemblies. Heat soaking may accelerate primary creep and expanded fluorocarbon materials may provide creeping sealants having inherent dimensional stability in at least one dimension without relying on fillers or fibers of other materials.

25 Claims, 9 Drawing Sheets

DETAIL A

ULTRA-PURE, NON-REACTIVE, ELEVATED-TEMPERATURE SEAL ASSEMBLY

BACKGROUND

1. The Field of the Invention

This invention relates to semiconductor processing technology and, more particularly, to novel systems and methods for sealing joints, conduits, pumps, and heaters carrying ultra-pure fluids for processing operations.

2. The Background Art

Chemically clean environments maintained for handling pure de-ionized (DI) water, acids, chemicals, and the like, must be maintained free from contamination. Leakage into or out of a liquid must be eliminated. Moreover, leaching and chemical reaction between any contained fluid and the carrying conduits must be eliminated.

In particular, the semiconductor manufacturing industry relies on numerous processes. Many of these processes require transportation and heating of DI water, acids and other chemicals. Whereas other industries may require purities on the order of parts per million of contaminants, the semiconductor industry may require purities on the order of parts per trillion.

Several difficulties exist in current systems for heating, pumping, and carrying process fluids (e.g. acids, DI water, etc.). By clean or ultra-pure is meant that gases or liquids cannot enter or leave a conduit system to produce contaminants above permissible levels. To obtain and maintain a clean conduit system, traps are to be avoided. Traps may be small passageways, nooks, crannies, threads, or dead ends, where chemicals may break down over time to form contaminants. Likewise, particulate matter may accumulate in such traps.

Currently, a system is needed that is both durable and responsive for heating process fluids. For example, many immersion heaters exist in the prior art. Immersion heaters place a heating element, typically sheathed in a coating, directly into the process fluid. The heating element and process fluid are then contained within a conduit. A failure of a sheath may directly result in metallic or other contamination of the process fluid.

Contamination in a process fluid may destroy tens of thousands of dollars in value by introducing contaminants into a process. Temperature transients in immersion heaters may overheat a sheath. Temperature transients in radiant heaters may fracture a rigid conduit.

Material transitions between parts fitted together and made of the same material, and of parts fitted together and made from different materials are of substantial interest. Monolithic parts (e.g. long sections of continuous tubing) may be formed of a suitable material. However, fittings to connect other fluid couplings to such a monolithic part may create traps, introduce new materials, create problems in sealing, perpetuate leaks, or the like.

It is desired to provide heating without an immersion-heating element. It is also of interest to provide trap-free, leak-free, non-reactive, reliable, durable, and consistent transitions between ultra-pure, non-reactive parts, whether of the same or of different materials. In particular, it is desired to form a fluorocarbon part transitioning to another fluorocarbon part with a stable seal. Also desired is transition of a quartz, particularly a fused quartz, conduit transition to a fluorocarbon part.

Fluorocarbons have a substantial amount of creep or inelasticity inherent in their mechanical properties.

Elevated temperatures are required in semiconductor processing. Temperatures over 100° C., especially those sustainable over 120° C. may be required. In certain instances, temperatures as high as 180° C. may be approached. Thus, it is desired to provide a chemically clean, particle-free, fully flushable, leak-free system for pumping, heating, carrying, and otherwise handling ultra-pure fluids at elevated temperatures. Durable seals having minimum of maintenance, reduced or eliminated maintenance while maintaining a clean, non-reacting environment, are needed. It is preferred that all heating, pumping, and carrying of process fluids include virtually no possibility of contact with any metals regardless of the ostensibly non-reactive natures of such metals, regardless of a catastrophic failure of any element of a transfer or conduit system.

BRIEF SUMMARY AND OBJECTS OF THE INVENTION

In view of the foregoing, it is a primary object of the present invention to provide a sealing assembly, a heater, and a pump interconnected by conduits of non-reactive, ultra-pure, trapless conduits for handling process fluids at elevated temperatures in the range of 0° C. to 180° C.

It is an object of the invention to provide a heater having a serpentine pattern of conductive ink forming a resistor over an outside surface, thus eliminating any need for an immersion heater capable of contaminating a process fluid following a catastrophic failure.

It is an object of the invention to provide a seal comprising a material subject to primary creep, in an assembly capable of providing a consistent seal.

It is an object of the invention to provide a sealing assembly including a seal comprising a material subject to secondary creep and capable of consistent sealing.

It is an object of the invention to provide a sealing assembly requiring no 'O' rings, yet accommodating factory-run tolerances in quartz tubing.

It is an object of the invention to provide a face seal effective to seal a lip at one end of a quartz tube.

It is an object of the invention to provide a sealing assembly transitioning a face of a creeping fluoropolymer material and an end of a quartz tube having tolerances no more restrictive than conventional, factory-run requirements on roundness, ovality, perpendicularity, bow, cutting, concentricity, wall thickness, diameter, and the like.

It is an object of the invention to provide a method for accelerated creep to transition a fluoropolymer sealing assembly to secondary creep for maintaining a seal.

It is an object of the invention to provide a restraining mechanism relying on remote, bulk mass, non-creeping restraints, or both, in order to stabilize creep in a sealing assembly having both creeping conduit components and a creeping seal, particularly wherein the creeping materials are fluoropolymers.

It is an object of the invention to provide a seal that is self-energizing, although creeping, with sufficient polymeric integrity to provide an energized creeping seal integrity and mechanical connection.

It is an object of the invention to provide a seal stabilized by conservation-of-mass principles by restraints in all dimensions.

It is an object of the invention to provide a sealing assembly for transitioning between quartz tubing and a fluoropolymer fitting at elevated temperatures and pressures typical of semiconductor processing fluids, while maintaining purities and non-reactivities on the order of the parts-perbillion required for processing semiconductor chips, eliminating traps, and accommodating the inherent creep characteristics of the fluoropolymers.

It is an object of the invention to provide a heater having electrical resistance in close proximity to a process fluid for heating by conduction and convection without exposing process fluids to a prospect of contamination, even if electrical failures, even melting of conductive paths, occurs within a heater.

It is an object of the invention to provide a fluorocarbon-to-fluorocarbon, face-to-face seal, as well as a lip-edge-to-face seal for a rigid-lip-to-creeping-face seal within the factory tolerances of all parts without requiring any substantial modifications to factory-run, production parts.

Consistent with the foregoing objects, and in accordance with the invention as embodied and broadly described herein, a method and apparatus are disclosed in one embodiment of the present invention as including a heater comprising one or more tubes of quartz, each provided with a serpentine pattern of conductive ink forming a resistor over the outside surface. Two tubes may be abutted end-to-end with an adaptor (e.g. fluorocarbon fitting) fitted to transition between two tubes in a series. One pass or passage, comprising one or more tubes of quartz in a series, may be fitted on each end to a manifold (e.g. header/footer) comprised of a fluorocarbon material for passing liquid into and out of the individual passage. Each passage or pass may have a seal at each end between the respective lip of the rigid (e.g. quartz) tube and the face of the creeping (e.g. fluorocarbon) fitting (e.g. adaptor, header, manifold, footer, etc.).

In certain embodiments, fluorocarbon parts may be supported against radial distortion by flow, creep, and the like, by a retaining ring of a non-creeping material such as a metal. Similarly, fluorocarbon parts may be heat soaked under stress to accelerate primary creep, advancing the fluorocarbon materials into a secondary creep phase. The fluorocarbon face involved in a seal, whether to a lip of a rigid tube or to a face of another fluorocarbon fitting may thus be stabilized.

Moreover, radial restraint for stabilizing a fluorocarbon portion of a sealing assembly may be maintained by merely a massive bulk of the same fluorocarbon material. Thus, at some distance from a highly-stressed region associated with a face seal or lip-to-face seal, the stress in a fluorocarbon bulk material may be reduced such that the bulk material provides a restraint on the portion having the higher stress.

In one embodiment, a heater may be manufactured by silk-screening. A conductive ink may be printed through a silk screen onto a quartz tube. The masking pattern applied to the silk screen may provide a serpentine pattern of conductive ink appropriate for extending along the length of a rigid (e.g. quartz) tube. Accordingly, a quartz tube may be positioned under the mask on the silk screen. An inked roller prints, through the mask onto the outer diameter of the quartz tube, the pattern of the conductive ink. The quartz tube may then be heated to sinter the conductive ink into a continuous ribbon of conducting, metallic material. Lugs may be soldered onto the sintered, conductive material to provide electrical connections to cabling.

In a method and apparatus in accordance with the invention, a lip seal may be formed between a lip of a comparatively rigid tube and a creeping face. A creeping gasketing material may be interposed therebetween. In one embodiment, a fluoropolymer sealant material may be formed to fit between the rigid lip and the creeping face. An expanded fluoropolymer may be suitably formed to serve as a sealant material.

In certain embodiments, a face comprised of a creeping material may be sealed against a face of another component comprised of a creeping material. A creeping fluoropolymer or an expanded fluoropolymer may be interposed between the two creeping faces. An expanded fluoropolymer may provide adequate sealing despite its creeping nature. Inasmuch as the interior edge of a sealant is exposed to the contained pressure, creep may occur in all dimensions to sustain a sealing effect. Long polymer chains may extend across a sealed boundary maintaining some dimensional stability in a sealant material. Meanwhile, general creep may provide a self-energizing sealing by the creeping material interior to the sealed boundary. In certain embodiments, the creeping sealant material may behave like a putty, to the extent that it creeps, yet like a fiber, to the extent that extended, oriented, polymer chains maintain material integrity.

In certain embodiments, fibrils formed by fluoropolymer chains, may extend and orient across a sealed boundary to maintain some structural integrity. Nevertheless, on opposing sides of the sealed boundary crossed by the fibrils, the general bulk of the sealant material is free to creep in accordance with applied forces. Thus, a lip seal and a face seal can tolerate substantial variations in pressure along the seal boundary, in the direction of the flow path, and normal to the sealing direction.

In certain embodiments, a rounded lip around a circumference of one end of a tubular member, such as a quartz tube, may provide orders of magnitude of increase in pressure near a line defining a closest point between the lip and a face to which the lip is sealed. The creeping sealant interposed therebetween reduces stress concentrations on the comparatively rigid tube, thus eliminating breakage. Meanwhile, factory-run tolerances are completely permissible in virtually all dimensions of the rigid tube.

In certain embodiments, heat soaking may permit progress of a sealant material, and a face material, or two faces, through primary creep and into a secondary creep. Secondary creep varies by an order of magnitude, and approaches the deflections due to elasticity of materials. Primary creep strain is substantially larger than elastic strain for face materials and seal materials.

No flanges are required. No metals are required, although a restraining ring of metal may be used in certain embodiments. In general, a bulk material extending away from a stressed sealing area, may support the sealing region of a seal assembly against additional, excessive primary or secondary creep. Thus, no rigid materials need be required on both sides of a compliant, particularly creeping, sealant.

The sealing assemblies in accordance with the invention have been found to be effective in connecting pumps to conduits carrying the inputs and outputs therefrom, heaters, pressure-relief valves, and other conduit connections required for handling process fluids in the semiconductor processing industry.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 8, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. Those of ordinary skill in the art will, of course, appreciate that various modifications to the detailed schematic diagram may easily be made without departing from the essential characteristics of the invention, as described in connection with FIGS. 1–8 above. Thus, the following description of FIGS. 1–8 is intended only by way of example, and simply illustrates certain presently preferred embodiments of a schematic diagram that is consistent with the invention as claimed herein.

Figure 1:
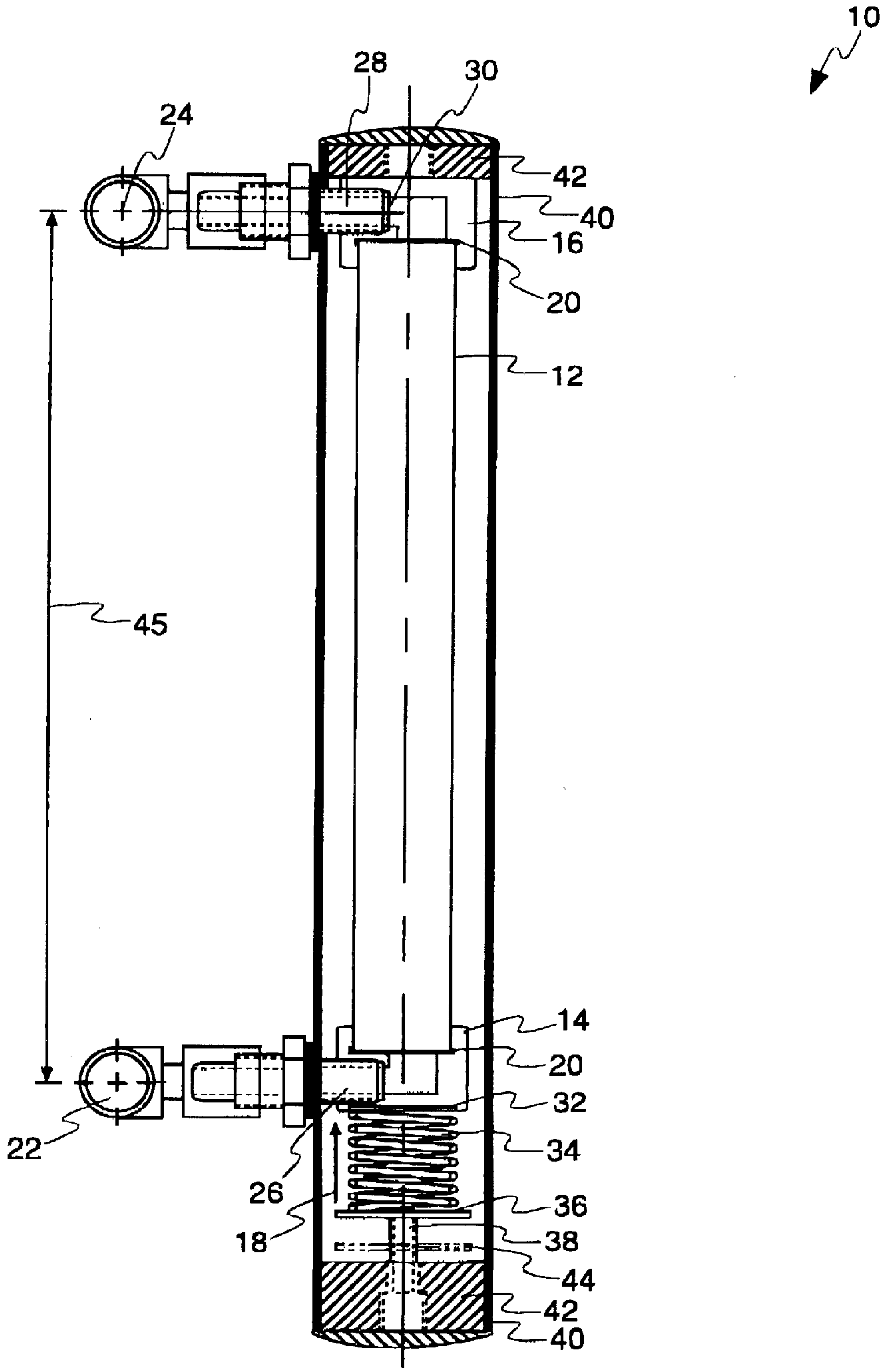
FIG. 1 is a side elevation view of a heater unit implementing a lip seal and a face seal in accordance with the invention.

Referring to FIG. 1, an apparatus 10 may be created for heating or otherwise handling process fluids such as used in the semiconductor industry. The semiconductor-processing industry requires ultra-pure water, acids, and the like. A conduit 12 may be formed of a comparatively rigid material such as quartz.

Fused quartz has been found to resists distortion over time while providing dimensional stability and repeatable structural properties. Meanwhile, quartz has been found to be sufficiently nonreactive with processing fluids to maintain better than parts-per-billion (or even trillion) purity requirements in acids and water, such as de-ionized water (DI).

A conduit 12 may be fitted with a header 14. The header 14 preferably relies on no 'O' rings. Typically, the diameter and ovality tolerances on the conduit 12 are sufficiently large in factory-run (standard production tolerances without additional selection according to higher tolerance specifications, or post-manufacturing processing) conduits 12 that they will routinely break during assembly onto "O"-rings. Likewise, numerous tolerances must be maintained at much higher accuracies than are available from factory-run production units.

For example, end cuts to form the conduits 12 introduce microscopic cracks, lack of perpendicularity, and the like. Thus, the compression required by 'O' rings may produce sufficient hoop stress in a conduit 12 to routinely break the conduit 12 during an assembly process or during service.

FIGS. 1–6 may be relied upon for observing details in the assembly of the header 14 and conduit 12. For clarity, a header 14 may be thought of as representing an inlet end of a conduit 12, while a footer 16 is another header 14 at the exit end of a conduit 12. A header 14 and footer 16 may be virtually identical, and may be assembled with the conduit 12 in identical manner.

In one embodiment of an apparatus and method in accordance with the invention, a force 18 may be applied to a header 14 (recall that a footer 16 is also a header 14) to seal the header 14 against the conduit 12. A seal 20 or sealant 20 may be disposed between a creeping material forming the header 14, and the comparatively rigid conduit 12.

An inlet 22 may provide to a plurality of headers 14 a processing fluid. An outlet 24 may convey away from a footer 16 fluid leaving the apparatus 10. Fittings 26, 28 in the respective headers 14, 16 may be formed to properly load a seal 30. In certain embodiments, the fittings 26, 28 as well as the headers 14, 16 may be formed of a creeping material.

For example, fluoropolymers have been found to be highly resistant to reactive chemicals. Moreover, temperature ranges between 100° C. and 180° C. may be approached.

The properties of fluoropolymers (e.g. polytetrafluoroethylene, and other materials sold under the trade name of TEFLON™) have been found suitable. These creeping materials are typically subject to primary creep. Extensive time and loading may be required, as well as periodic maintenance for previous systems in order to maintain a seal on the creeping material.

Primary creep may be thought of as creep that results in a deflection or strain substantially larger than elastic strain. Typically, creep may be in order of magnitude larger than elastic strain. Secondary creep occurs in certain polymers at various temperatures and over an extended period of time. Typically, secondary creep may be thought of as creep that results in a strain or deflection of the same order of magnitude as elastic deflection.

A pressure plate 32 may contact the header 14 to apply the force 18 required to load the apparatus 10, particularly this seal 20 or sealant 20. The pressure plate 32 may be loaded by a resilient member 34, such as a spring 34. In certain embodiments, the resilient member 34 may be hydraulically loaded, loaded by a deformed elastomeric member, or the like. In one presently preferred embodiment, a steel spring 34 may be captured between the pressure plate 32 and a base plate 36. An adjuster 38 may move the position of the base plate 36 to apply the proper force 18 to the pressure plate 32.

The adjuster 38 may be connected as appropriate to a frame 40. For example, in the illustrations of FIG. 1, a cap 42 is secured to the steel tube 40 to form a frame 40. The adjuster 38 moves the base plate 36 from some initial position 44 to compress the spring 34, thus creating the force 18 to load the seal 20.

The length 45 of the apparatus 10, or the assembly comprising the headers 14, 16 and the conduit 12, may be selected according to different parameters of interest. For example, the total temperature rise in a fluid contained in the conduit 12 may be important.

Alternatively, mechanical strength considerations may be limiting of the length 45. For example, the force 18 and the tube wall thickness for a conduit 12 along with a bow tolerance may limit the length 45. However, in certain embodiments, multiple conduits 12 may be connected in a series as discussed below.

Figure 2:
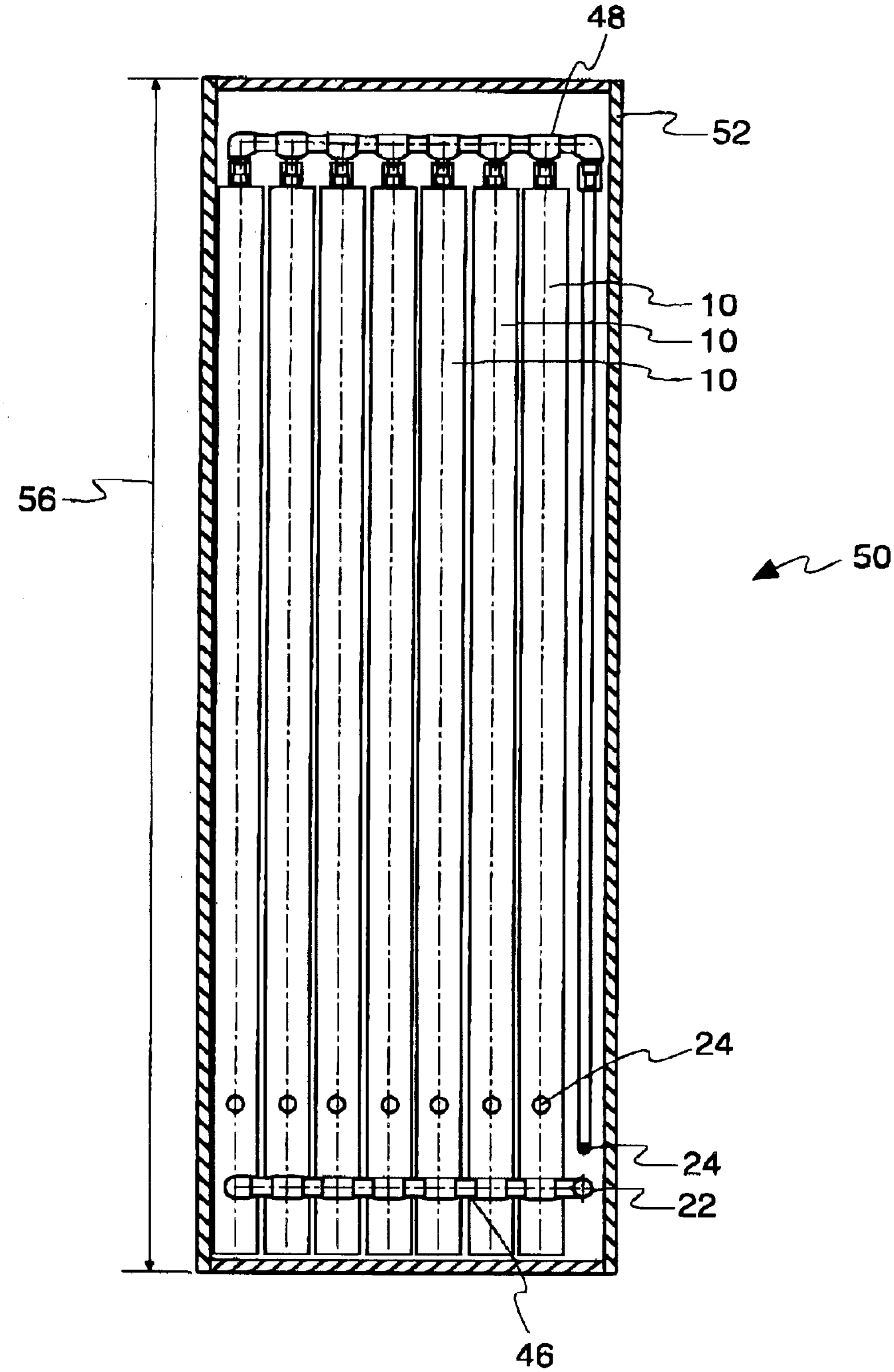
FIG. 2 is a front elevation view of a heater assembly including multiple units as illustrated in FIG. 1.

Referring to FIG. 2, the inlet 22 may lead to a feed line 46 or manifold 46. The manifold 46 may connect to a plurality of headers 16. Similarly, the outlet 24 may pass fluid received from a manifold 48 or discharge line 48 attached to a plurality of footers 16 (headers 16).

A plurality of the individual apparatus 10 may be assembled as a heater 50 in a cabinet 52. The cabinet 52 may provide an outer frame 52. Nevertheless, in one presently preferred embodiment, the principle frame 40, applying the force 18 to each conduit 12 is a tubular, metal member 40, concentric with the individual conduit 12.

In certain embodiments, apertures 54 may be provided in the frames 40 or tubular members 40 surrounding the conduits 12. In certain embodiments, the frame 40 may actually comprise end plates, such as the caps 42, connected by bolts parallel to the conduit 12. Nevertheless, for a tubular member 40, an aperture 54 may be provided for access, viewing, or for receiving an electrical bushing carrying electrical current for operating the heater 50.

The heater 50 need not use immersion heating elements.

Immersion heating elements typically contain an electrically conductive element for carrying electric current. The conductive element is typically a resistor for generating electrical losses. Thus, the heating element heats up when subjected to current.

In typical embodiments, immersion heaters include a sheath surrounding a heating element. The sheathed heating element is submerged in a plenum containing the process fluid to be heated. However, a current surge, a boiling nucleation site, two-phase flow, or other circumstance may cause a temperature rise above a melting temperature of a sheath. Sheathing materials are typically polymers. Heating elements are typically metals.

Metals usually have higher melting temperatures than the polymers. Accordingly, a meltdown of a polymer sheath is a common occurrence. Without the polymer sheath, a metallic heating element may leach metal atoms into a fluid. If the fluid is water, oxidation may occur, or particulate matter may be carried away. If the process fluid is an acid, substantial reactions may occur, contaminating the process fluid and destroying any product being processed. Plumbing or process equipment that this fluid contacts is also destroyed, typically.

Thus, the heater 50 does not expose heating elements containing metals to the process fluid inside the conduits 12. The conduits 12 may pass heat by conduction, or radiation. In one presently preferred embodiment, a resistive coating on the conduit 12 heats the conduit 12. The heat passes through the conduit 12 into the process fluid therein.

Figure 3:
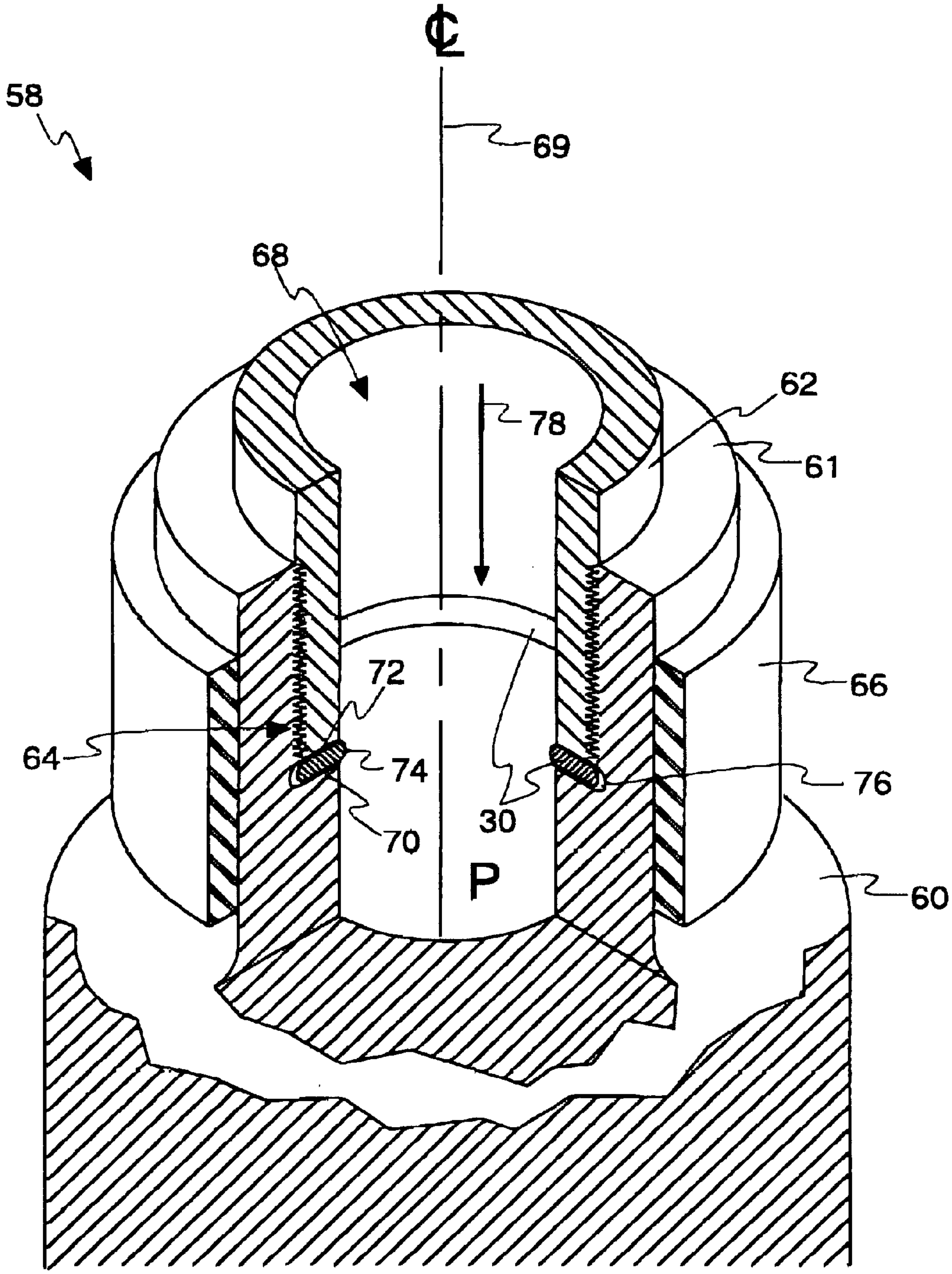
FIG. 3 is a cutaway, perspective view of a sealing assembly illustrating a creeping face seal completely loaded by creeping materials, including an optional restraining ring of a metallic material, as well as illustrating a bulk material.

Referring to FIG. 3, a sealing assembly 58 may be formed for connecting the fitting 26 to the header 14. In general, a base 60 may be a portion of the header 14. Nevertheless, the base 60 may be a pump body, or other device. A compressor 62 and the base 60 may be threaded to have mutually-engaging threads 64. The threads 64 are preferably straight threads. Standard pipe threads, and other fixture threadings common in fluid-handling systems are typically sources of traps.

For example, national pipe threads (NPT) are tapered, thus, the threads 64, if formed of NPT standard fixtures may have a long trap along their length. Thus, the thread 64, in one currently preferred embodiment, are straight threads 64 providing no opportunities for traps.

A retainer 66 is optional. The retainer 66 may contain the base material 60 into which a compressor 62 is fitted. The size of the base material 60, and the extension of a passage 68 away therefrom, may effect the need for a retainer 66. In one embodiment, the base material 60 may receive a compressor 62 threaded into a thread 64 beginning at a flush surface of the base material 60.

In the illustration of FIG. 3, the center line 69 of the passage 68 may be thought of as defining an access for the compressor 62 threaded into the base 60. An anvil 70 forms one face 70 of a sealing assembly. The anvil 70 is formed as a face molded or machined or otherwise fabricated in the base 60. Note that the base, in the illustration of FIG. 3 extends out to a boss region 61. The threads 64 could extend into the bulk of the base material 60 instead.

The foot 72 or face 72 is formed on the compressor 62. A seal 30 is disposed between the foot 72 and anvil 70. It is important to note that the foot 72 and anvil 70 are formed of a creeping material in one presently preferred embodiment. Moreover, the seal 30 or sealant 30 is formed of a creeping material. In one currently preferred embodiment, the sealant 30 is formed of an expanded polymeric material, such as an expanded fluoropolymer.

Assembly of the compressor 62 into the base 60 will compress the creeping material of the sealant 30. Accordingly, an extrusion 74 may extend somewhat from the base 60 or compressor 62. A relief 76 may accommodate extrusion outward. Also, the relief 76 may tend to capture the seal 30 during assembly. Thus, locating the seal 30 may be facilitated by providing relief 76. Also, the relief 76 may be provided for terminating the threads 64 cleanly and precisely.

The fluid flow 78 passes through the passage 68, encountering no access to traps. In one currently preferred embodiment, the compressor 62 may be assembled to compress the seal 30 between the anvil 70 and foot 72. Primary creep may occur in the compressor 62 and base 60 as well as the seal 30. Heat soaking the entire sealing assembly 58 under the load applied by the compressor 62 may advance the creep into secondary creep.

Figure 4:
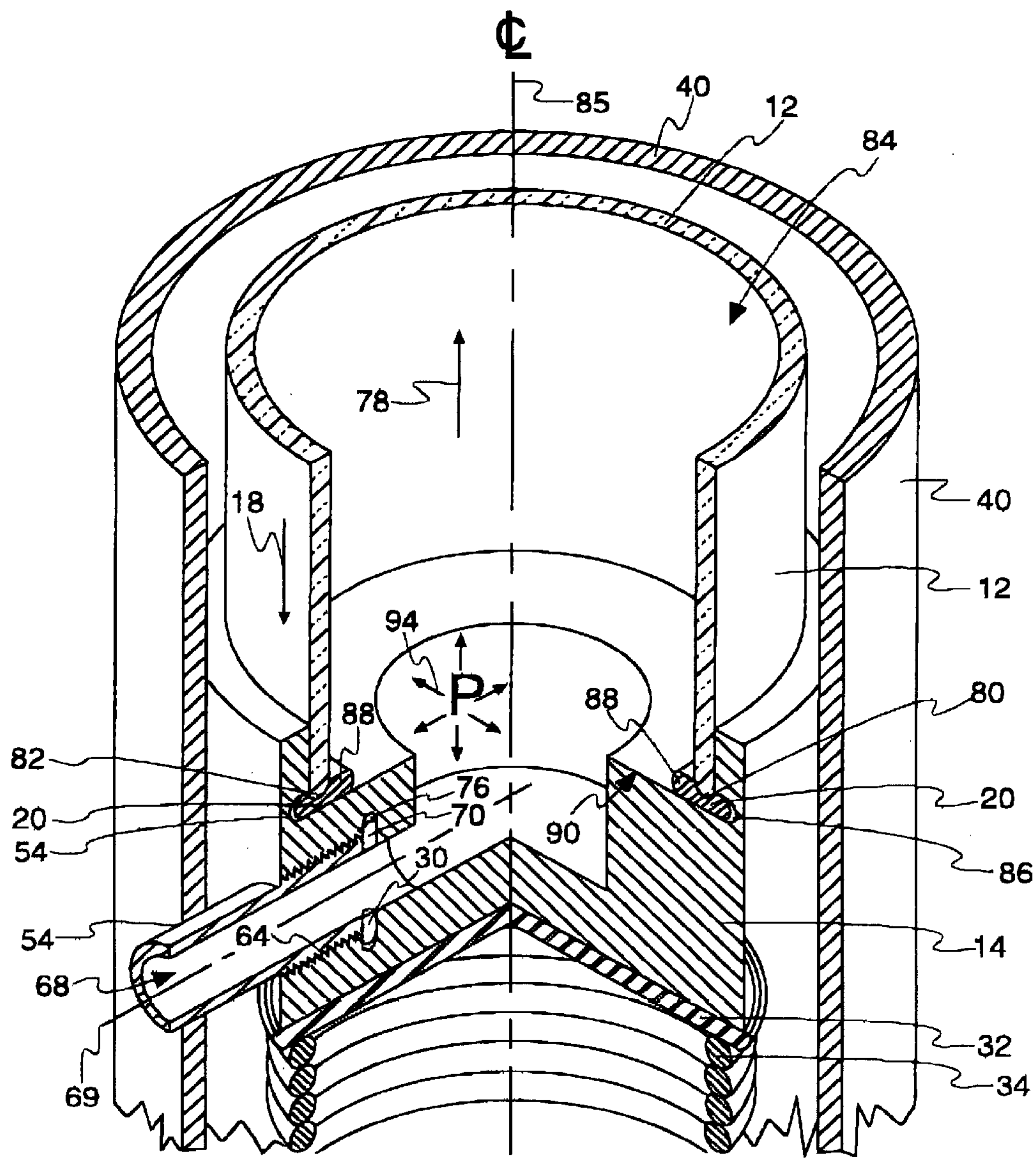
FIG. 4 is a cutaway, perspective view of a lip seal in accordance with the invention in which a comparatively rigid lip of a tubular conduit is sealed against a face of a creeping material by a creeping sealant or seal member.

Referring to FIG. 4, a conduit 12, assembled with a header 14 may effect an excellent seal without using 'O' rings. In one presently preferred embodiment, a round face 80 or lip 80 may be formed by heating a conduit 12 during the routine manufacturing process. For example, quartz tubing 12 may be formed in certain standard lengths, and cut to saleable lengths.

The lip 80 may be formed by firing the ends of each of the conduits 12. A resulting radius 82 contains virtually no cracks that might have been introduced by the cutting process. Nevertheless, cutting quartz tubing 12 to length may introduce certain errors in the perpendicularity of the lip 80 with respect to a center passage 84 defined by a center line 85.

The seal 20 and the header 14, being comprised of creeping materials, accommodate the factory-run tolerances for perpendicularity, diameter, concentricity, ovality, and so forth, that may occur in the conduit 1. A relief 86 may be provided for retaining a seal 20 during assembly. Likewise, the relief 86 may contain a portion of the seal 20 after extrusion thereto during compression.

In one presently preferred embodiment, an extension 88 of the seal 20 may extend into the passage 84. The sealant 20 or seal 20 is comprised of a creeping material. Accordingly, certain behavior of creeping materials may react similarly to putty. The extension 88 into the passage 84 may creep toward the lip 80 effecting a seal whenever necessary.

Additional mechanisms in the seal 20 may act to prevent the seal 20 from acting completely like putty. For example, extension of polymeric change in the sealant 20 may provide structural integrity between the portion of the seal 20 in the extension 88, and that portion near the relief 86. Accordingly, the extension 88, and the seal 20 under the lip 80 and in the relief area 86 may all be connected together by extended polymer chains.

The anvil 90 provides a face. However, the lip 80 does not provide a face. If the anvil 90 and the lip 80 were both rigid, a line contact or even point contact would occur. Nevertheless, because the anvil 90 is formed of a creeping material, and because the seal 20 is formed of a creeping material, the seal 20 and anvil 90 may comply with the wavy (axial variation) tolerance occurring circumferentially around the lip 80.

Meanwhile, the fitting 26 may be threaded into the threads 64 to provide a fluid passage 68 inducting process fluid into the passage 78. The seal 30, described in reference to FIG. 2 above, may be positioned against an anvil 70 in the header 14.

Although the pressure 94 may be isotropic, certain variations may occur due to fluid mechanics. Nevertheless, in general, the pressure 94 may be perceived as acting on the extension 88 as well as on the conduit 12. The pressure 94, may be thought of as hydrostatic from a practical standpoint in analyzing the behavior of the creeping materials in the fitting 26, header 14, seal 30, and seal 20.

Figure 5:
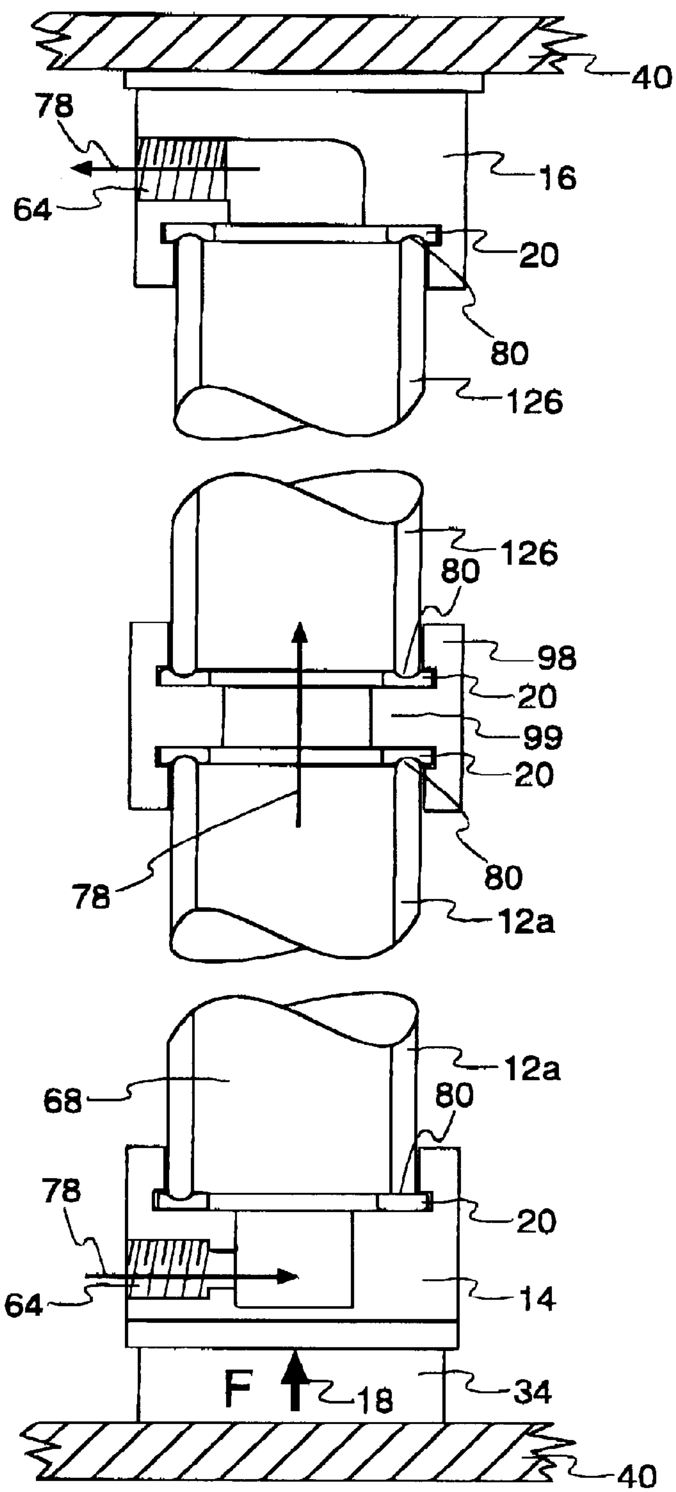
FIG. 5 is a segmented, side elevation view of a heating unit in which comparatively rigid tubes are abutted to form a conduit of extended length between two headers.

Referring to FIG. 5, a plurality of conduits 12 (e.g. 12*a*, 12*b*, etc.) may be attached in the series. An adapter 98 may be interposed between abutting conduits 12*a*, 12*b*, the resilient member 34, such as a spring 34 may apply a force 18 to a header 14. The header 14 may receive and support a conduit 12*a* against a seal 20. A seal 20 may be positioned on each side of a bridge 99 or bridge portion 99 of the adapter 98.

In one presently preferred embodiment, an adapter 98 may interface with a seal 20 and a conduit 12 in exactly the same manner as any other header 14, 16 combining two conduits 12*a*, 12*b* in series by way of an adapter 98, permits an increased temperature rise in the flow 78 therethrough. Thus, the fluid or flow 78 at the header 16 may have a larger temperature increase above the temperature at the header 14.

In general, a frame 40 may be constructed in any suitable manner. In the embodiment of FIG. 1, the frame 40 is a cylindrical tube, concentric with the conduits 12.

Figure 6:
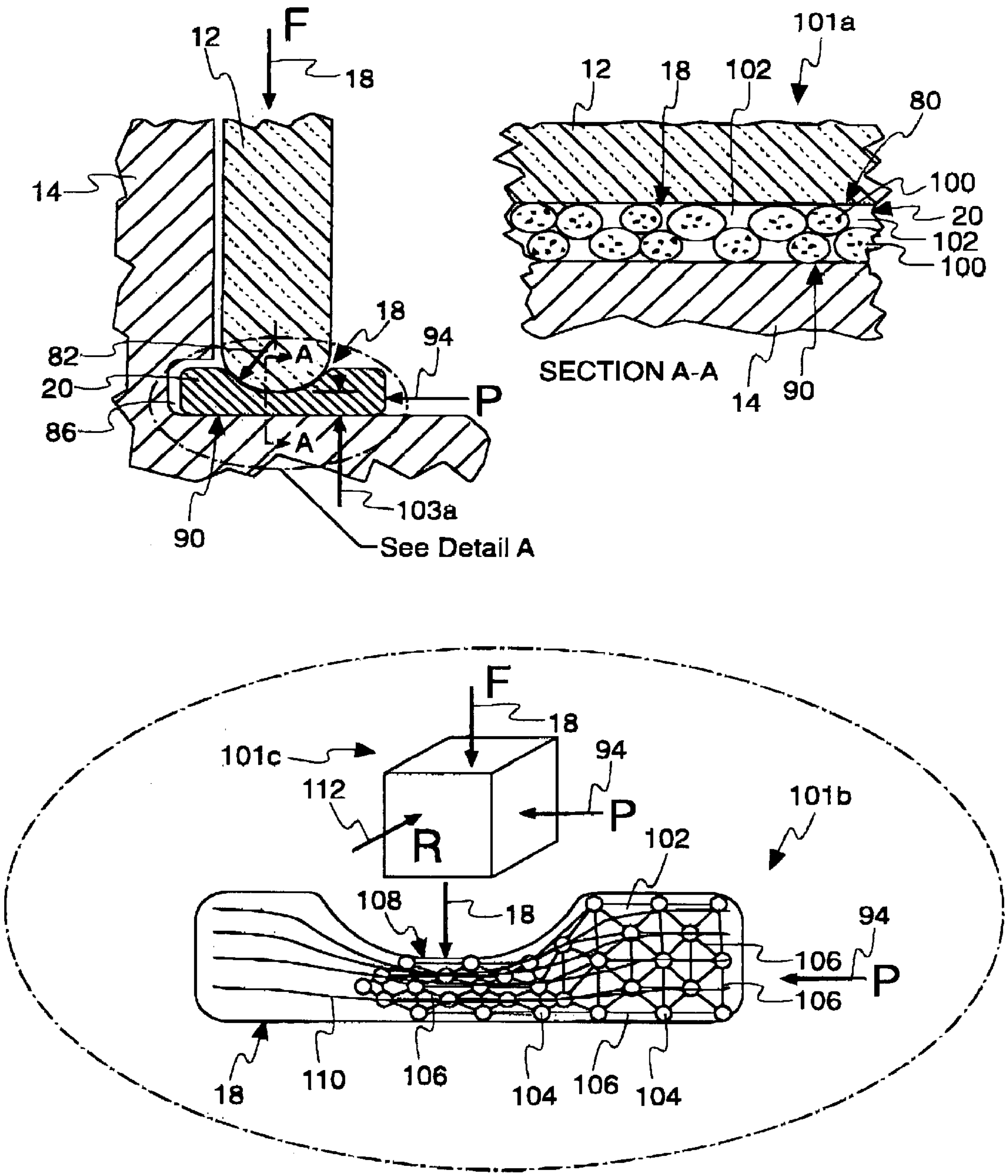
FIG. 6 is a schematic diagram of a lip seal of FIGS. 4–5 illustrating certain behaviors of fluoropolymer sealant materials in forming a lip seal.

Referring to FIG. 6, a lip 80 forming an edge of a conduit 12 is illustrated in cross-section. The cross-section is taken in a plane including a centerline access 85 and a radial access, such as the centerline 69 (see FIG. 4). A radius 82 defines or interfaces with a seal 20 interposed between the conduit 12 and an anvil 90 of the header 14. A pressure 94 acts against the seal 20. The relief region 86 may be filled completely or incompletely by extrusion of the seal 20 under the force 18 applied through the lip 80 of the conduit 12.

Certain behaviors of polymer chains 100 are illustrated and magnified in schematic sections 101*a*, 101*b*. The section 101*a* illustrates an end of view section along a circumference of a conduit 12. Accordingly, each of the polymer chains 100 may alternate with interstices 102 throughout the seal 20. Since the section 101*a* may also be thought of as the circumferential surface 101*a* at the point of minimum proximity between the lip 80 and the face 90 or anvil 90, the interstices 102 may be voids or may contain polymer chains 100 not aligned to cross normal to the circumference surface 101*a*.

However, in certain embodiments of an apparatus in accordance with the invention, creep of the seal 20 under the force 18 applied by the lip 80 may tend to align the polymer chains 100. Moreover, in certain embodiments, the seal 20 may be comprised of an expanded polymer, such as an expanded fluoropolymer. Thus, the polymer chains 100 may already be extended and aligned to cross more-or-less perpendicular (normal) to the circumferential surface 101*a*. In certain embodiments, the interstices 102 may be smaller than a molecular diameter of molecules of the fluid contained in the conduit 12. Thus, the seal 20 will stop leakage.

Creep of the seal 20 in response to the pressure 94 may cause recoiling of polymer chains 100 inside the conduit 12. Thus, the aligned and extended polymer chains 100 may hold radially the remainder of the seal 20 that may or may not be aligned.

In general, during creep, a polymer chain 100 may extend in a direction of tension, coil or densify in an un-oriented fashion under compression, and similarly densify or at least bunch in an un-oriented fashion if left over time, without load. Creep may be accelerated by increased temperatures. In the case of the molecular chains 100, radial extension thereof (with respect to the geometry of the conduit 12) may be exacerbated by creep under the lip 80.

On the contrary, orientation may be minimized or eliminated in a radial direction elsewhere. For example, a stress cube 101*c* illustrates the directionality of the force 18, pressure 94, and a restraining force 112. The stress cube 101*c* may also be thought of as representing a direction 18, direction 94, and direction 112. Each of the directions 18, 94, 112, corresponds to the direction of the force 18, pressure 94, and restraint 112, respectively.

In routine operation, the portion of the seal 20 between the lip 80 and the anvil 90 may be expected to compress in the axial direction 18, extend polymer chains 100 in a radial direction 94, while possibly extending or compressing in a circumferential direction 112.

The oriented polymer chains 100 prevent actual contact between the lip 80 and the anvil 90 (face 90). Moreover, creep may be multi-directional. Accordingly, polymer chains 100 may become oriented in a radial direction 94, and redistributed in a circumferential direction 112, in response to a force 18 in a direction 18. By such redistribution of a creeping material, in the seal 20, variations in the contact distance 103*a*, proximity distance 103*a*, between the lip 80 and the anvil 90 may be accommodated.

By contrast, many non-creeping materials have been found to provide sufficient resistance, loading, distortion, stress concentrations, and the like as to preclude sealing or to fracture the lip 80 of the conduit 12. A creeping seal 20 oriented by the lip 80 against the anvil 90 provides a suitable, self-energizing, compliant, yet recovering (by creep) sealing effect.

In one embodiment of an apparatus and method in accordance with the invention, a seal 20 may be comprised of an expanded polymer material. For example, the schematic 101*b* or sections 101*b* shown schematically in FIG. 6 illustrates how polymer chains 100 may actually be expanded to form nuclei 104 (e.g. like knots of chains 100) having fibrils 106 extending therefrom. The fibrils 106 represent polymer chains 100 extending away from the knots 104 or nuclei 104.

In response to a pressure 94, in a direction 94, the fibrils 106 may contract toward the lip 80. Likewise, within the loaded region 108 under the lip 80 (between the lip 80 and the anvil 90) the force 18 may compress the fibrils 106 and nuclei 104 into a compact mass of polymer chains 100. In an expanded polymer material, interstices 102 may be comparatively large, whether or not the fibrils 106 are aligned generally in any particular direction (e.g. radially 94).

Compression in the loaded region 108 of the seal 20 may reduce interstices 102 below the molecular size of a contained fluid. Moreover, variations along a circumferential direction 112 around the lip 80, may be sealed reliably by the self-energizing nature of the creeping material of the seal 20 inside the conduit 12 (e.g. in the passage 78 of FIG. 4). The pressure 94 improves the sealing capacity of the seal 20.

Inasmuch as a polymer chain 100 tends to become un-oriented, temperature and internal pressure 94 tend to completely fill the distance 103*a* between the lip 80 and the anvil 90 regardless of variations therein, along the circumferential direction (e.g. direction 112) along the lip 80.

One may note that the seal 30 (e.g. see FIG. 3) does not benefit from the radius 82 of a lip 80. Accordingly, the creep compression, alignment, and retraction illustrated in FIG. 6 may operate somewhat differently. The section 101*a* cannot be expected to provide the alignment characteristic of the polymer chains 100 in the section 101*b*. Nevertheless, loading and elevated temperatures may produce compaction of the polymer chains 100, or the nuclei 104 and fibrils 106 interconnected therebetween.

A temperature soak of a compressor 62 against an anvil 70 of a base material 60 may remove primary creep from the anvil 70 as well as the foot 72 of the compressor 62 and the seal 30. A conservation-of-mass principle applies.

For example, either the bulk material 60 surrounding the threads 64 in the bulk material 60, or a restraint 66 containing a boss region 61 of base material 60, may halt creep in one direction. Thus, fully loading the threads 64 to compress the foot 72 against the seal 30 on the anvil 70 may accelerate primary creep of the foot 72, anvil 70, and seal 30.

If the seal 30 is comprised of an expanded polymer, such as an expanded fluoropolymer, then the interstices 102 between polymer chains 100 (e.g. fibrils 106 and nuclei 104) may be reduced. Nevertheless, a pressure 94 (e.g. see FIGS. 3, 4, 6) tends to promote creep in a radial direction in accordance with conservation of mass.

Conservation of mass is an important principle. Although individual molecular chains 100 may be extended in an oriented fashion or bunched in a spaghetti-like mass, they occupy space. When the interstices 102 between polymer chains 100 in an expanded polymer are compressed, density cannot increase indefinitely.

Accordingly, in FIGS. 3, 6, compression by foot 72 of a seal 30 against an anvil 70 must abide by a conservation of mass. Compressed polymer chains 100 cannot retreat away from both the foot 72 and the anvil 70 indefinitely. Thus, a heat soaking of the sealing assembly 58 can accelerate the primary creep in the foot 72, anvil 70 and seal 30 providing some extrusion 74, but reliably sealing the passage 68 against leakage.

Containment by the bulk material 60 or the restraint 66 (e.g. a metal ring 66) prevents extrusion of the seal 30 beyond the relief 76. Thus, a seal may be made in the absence of a conventional flange. A compact sealing assembly 58 results.

Meanwhile, the creeping material of the compressor 62 and bulk material 60 is configured to load the seal 30 subject to secondary creep continuing in the compressor 62, base material 60, and seal 30. Nevertheless, the order of magnitude of secondary creep is similar to elastic strain or elastic deflection therein. Accordingly, creep due to the pressure 94 can continue to regenerate any deflection away from the foot 72.

Elasticity, particularly due to the lesser strain extant in the bulk material 60 may contain the sealing assembly 58 against uncontrolled creep radially (direction 94). The bulk material 60 may be sized to provide the necessary restraint. Alternatively, a restraint 66 may be applied to a boss 61. Gaining constraint by the forces existing in three directions, the seal 70 is controlled by conservation of mass principles. On the other hand, the polymer chains 100 in seal 30 do not relax to behave entirely like putty. Putty lacks the mechanical integrity of polymer chains 100 of the length available in fluoropolymers, for example.

Figure 7:
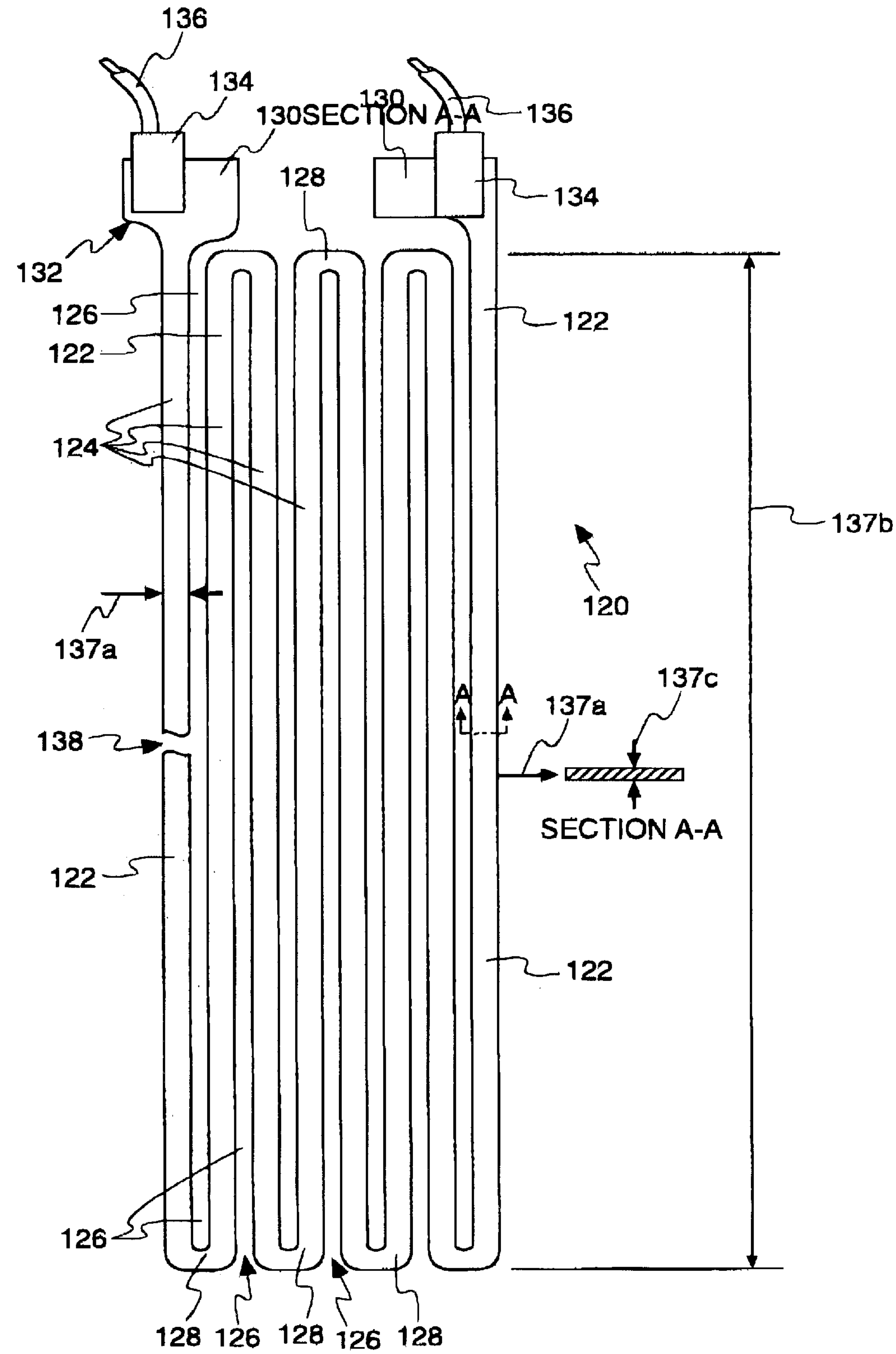
FIG. 7 is a side elevation view of a serpentine, conductive, ink pattern unwrapped to illustrate elements of the printing and connecting scheme thereof.

Referring to FIG. 7, heater ribbons 120 may be applied along the outside surface of a conduit 12. The heater ribbons 120 may be comprised of coating 122 or conductive material 122. The coating 122 may be patterned or amassed in paths 124 separated by gaps 126. The paths 124 are connected at end connections 128. In one presently preferred embodiment, the paths 124 may constitute one single serpentine path 124 continuously extending from end to end along a conduit 12, offset by a gap 126 with each traverse.

In one presently preferred embodiment, the coating 122 may be arranged in large patch panels 130 at one end of a conduit 12 in close proximity to one another. Patch panels 130 may narrow in a transition region 132 into each end of a path 124. Lugs 134 may be soldered or otherwise attached to the patch panels 130. Each lug 134 is electrically connected to a cable 136 or wire 136 carrying current to dissipate in the coating 122.

The paths 124 or a single continuous path 124 may be configured to have any suitable width 137*a*, length 137*b*, thickness 137*c*, and intervening gap 126. The continuation symbol 138 indicates that the path 124 may continue indefinitely about the entire circumference of a conduit 12. The coating 122 may be porous or comparatively continuous. The material used for the coating 122 may be selected to control the resistivity therein.

Figure 8:
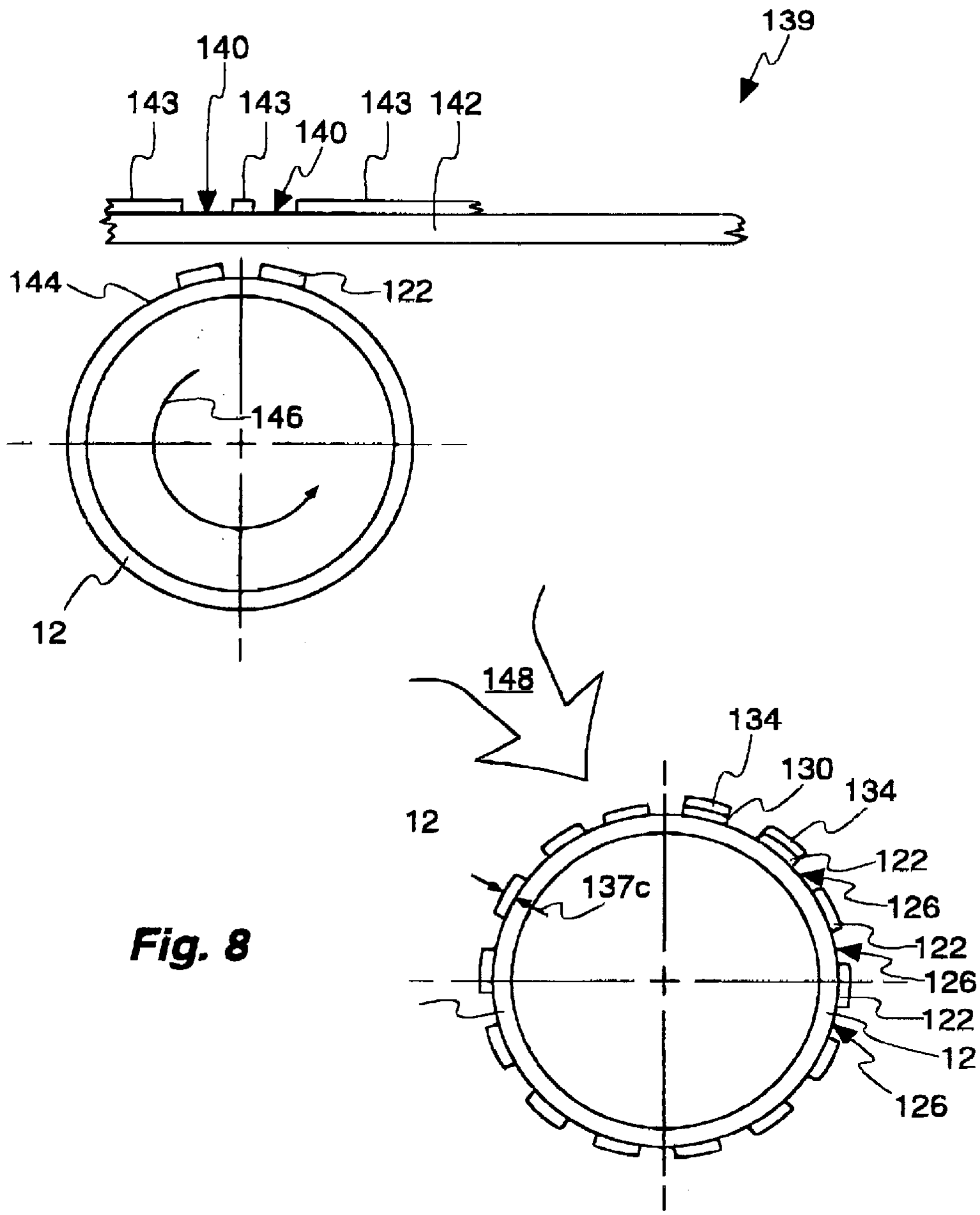
FIG. 8 is a schematic diagram of a silk screening and sintering process for applying a pattern of conductive ink, such as that of FIG. 7, to the heater tubes of FIGS. 1, 5, 6.

Referring to FIG. 8, a process 139 and apparatus are illustrated for applying the coating 122 onto conduits 12. In one embodiment, a pattern 140 for passing an ink 122 comprising conductive materials in a binder or carrier may be a printed through a silk screen 142. A mask 143 prevents application or transfer of the ink 122 through the silk screen 142 except through the pattern 140 that replicates the interconnected paths 124 of FIG. 7. The ink 122 is transferred to the outer surface 144 of a conduit 12 several lines at a time. By removing, rotating, and repositioning the conduit 12 in a circumferential direction 146, each location may be placed in contact with the silk screen 142. The ink 122 is transferred to the surface 144 forming a series-connected path.

Following transfer of the ink 122 to the surface 144, heat 148 is applied to sinter the conductive, typically metallic, material in the ink 122. In certain embodiments, carbon may be a conductive material in the ink 122. In other embodiments, silver flakes may be suspended in the ink 122.

Following the heating 148 or sintering 148 process, the ink 122 has become the coating 122 for conducting electricity therein with an appropriate electrical resistance. Thus, the individual conductive strips 150 are also resistive and correspond to the individual paths 124 separated by gaps 126 as illustrated in FIG. 7. Lugs 134 may be soldered onto the conductive strips 150, which strips 150 are typically a sintered metallic material.

The conductive strips 150 may have porosity remaining therein following sintering. Porosity may be used to control resistivity. On the other hand, the sintering 148 process may result in a substantially continuous conductive strip 150 whose resistance or resistivity is controlled by the width 137*a*, length 137*b*, and thickness 137*c* thereof.

Figure 9:
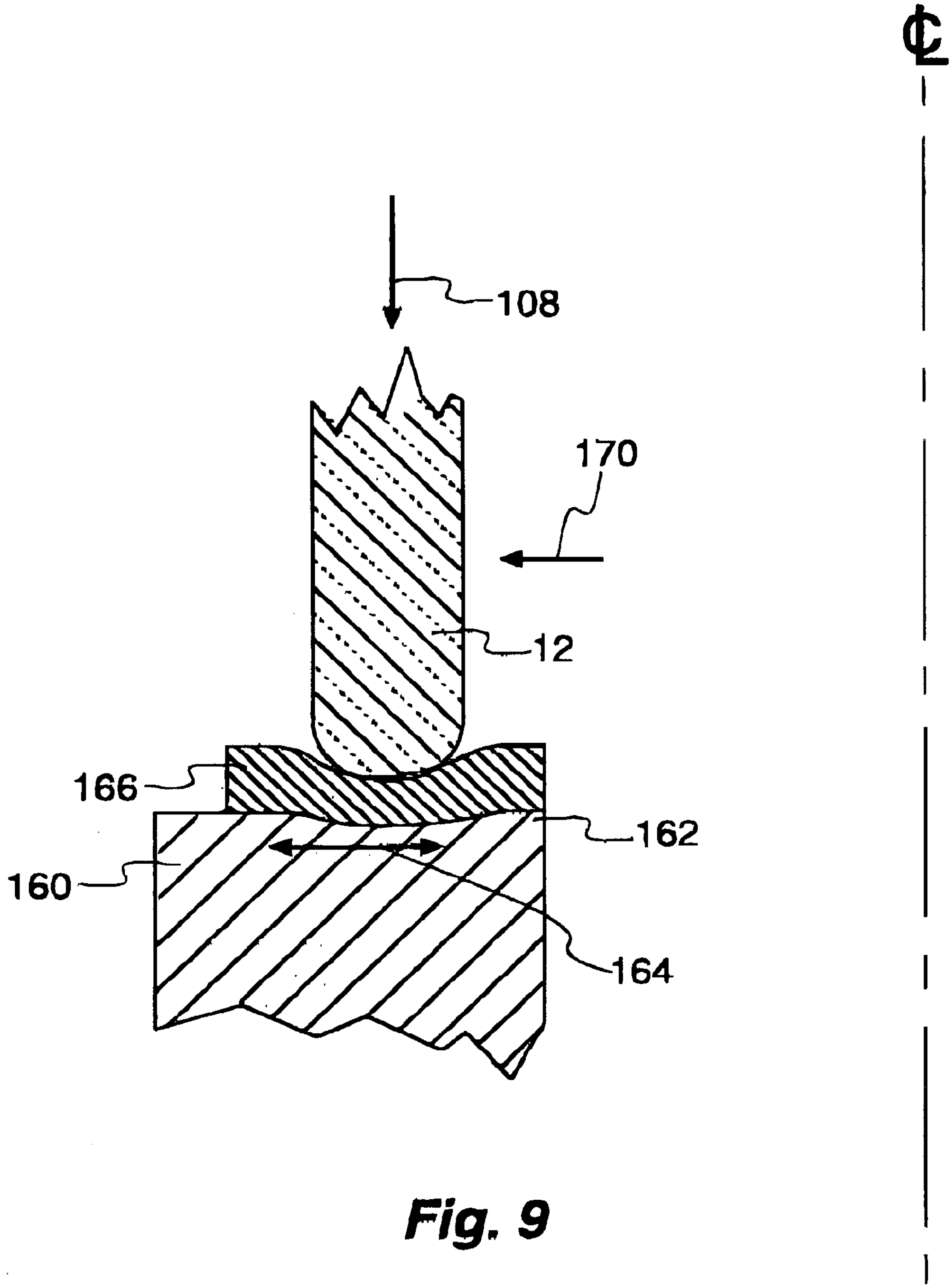
FIG. 9 is an elevation sectional view of a conduit forming a depression in a fixture and seal.

Referring to FIG. 9, a schematic, cross-section view of one side of a conduit 12 is forced toward the material 160, such as may compose the header 14 or footer 16, having an inner portion 162 located "inside" the conduit 12 in a radial direction 164. Interposed therebetween is a seal 166, such as the seal 20 or seal 30, loaded in an axial direction 168.

As a result of the loading of the material 160 in an axial direction 168 by the conduit 12, the material 160 compresses, leaving an inner portion 162 extending axially into the conduit 12. Upon thermal cycling between comparatively warmer and cooler temperatures, the inner portion may change dimensions in a radial direction 164. The engagement of the conduit 12 by depression into the material 160 is too secure. Resulting thermally induced stress in a radial direction 164 is substantial and can break the conduit 12 routinely.

Accordingly, another feature of the seal 166 (e.g. seals 20, 30 as described above) is a reduced sliding friction in a radial direction 164, as well as a tendency to round out any depression of the material 160. Thermal expansion and contraction of the material 160, with virtually no expansion or contraction by a conduit 12 of quartz, is accommodated by relative slipping therebetween in a radial direction 164. Thus, thermal expansion and contraction of the inner portion 162 does not break the conduit 12 when the seals 20, 30 (i.e. seals 166) are present as described herein.

From the above discussion, it will be appreciated that the present invention provides apparatus and methods for sealing creeping materials to other creeping materials or comparatively rigid materials. Face seals and lip seals providing ultra-pure, elevated-temperature, pressurized, reactive, process fluids may be thus sealed without creating traps occasioned by pipe fittings, coated materials having metallic structures, 'O' rings, or highly processed components requiring precision tolerances. Heating, pumping, and otherwise handling process fluids for the semiconductor processing industry is accommodated with comparatively inexpensive, low-toleranced non-reactive components. Flanges, whether metal or glass, are not relied upon. Thus, the sealing assemblies may be compact, compliant, reliable, clean, and durable.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for sealing connections between ultra-pure, non-reactive conduits, the apparatus comprising:

a conduit comprising a wall having a wall thickness and a wall center, the wall being formed of a high purity, non-reactive material for conducting a fluid maintained in a highly purified condition;

a header formed of a high purity, non-reactive, polymeric material for exchanging the fluid with the conduit;

a sealant, formed of a first creeping material positioned to extend between the conduit and the header and to extend from a position inside the conduit to an ambient external to the conduit, the creeping sealant being free to creep toward a joint region between the conduit and the header in response to pressure of the fluid in the conduit;

a frame for supporting a force applied between the header and the conduit through the creeping sealant; and a tensioner connecting between the frame and the header for maintaining the force above a sealing value, the tensioner further comprising a solid member formed to maintain the force at a substantially constant value.

2. The apparatus of claim 1, wherein the first creeping material is selected from creeping fluorocarbon polymers.

3. The apparatus of claim 1, wherein the first creeping material is selected from creeping materials subject to secondary creep.

4. The apparatus of claim 1, wherein the creeping material is subject to primary creep.

5. The apparatus of claim 1, wherein the conduit further comprises fused quartz.

6. The apparatus of claim 1, wherein the frame further comprises a tubular housing encapsulating the conduit and connecting the header to the tensioner.

7. The apparatus of claim 1, wherein the first creeping material is an expanded fluorocarbon polymer.

8. The apparatus of claim 7, wherein the header is formed of a second creeping material.

9. The apparatus of claim 8, wherein the second creeping material is a fluorocarbon compound.

10. The apparatus of claim 9, wherein the first creeping material is different from the second creeping material.

11. The apparatus of claim 1, wherein the first creeping material is an expanded polymer.

12. The apparatus of claim 11, wherein the conduit further comprises a lip portion, proximate one end thereof and rounded to relieve stress concentrations corresponding to the force applied on the conduit.

13. The apparatus of claim 12, wherein the wall center defines a nominal cylinder, and wherein the lip portion extends radially substantially only within the wall thickness.

14. The apparatus of claim 13, wherein the lip portion comprises a curved surface having a varying proximity to a header face supporting the sealant.

15. The apparatus of claim 14, wherein the proximity varies radially and circumferentially with respect to the conduit.

16. The apparatus of claim 15, wherein the first creeping material contains fibrils limiting creep therein proximate the wall center, and maintaining a connection between an inner portion of the creeping sealant and an outer portion of the creeping sealant.

17. The apparatus of claim 16, wherein the creeping sealant inside the conduit is subject to primary creep inside the conduit and secondary creep between the conduit and the header face.

18. The apparatus of claim 14, wherein the proximity varies to substantially a standard, corresponding, factory-run tolerance of an end cut of a fuzed quartz tube as obtained during manufacture.

19. The apparatus of claim 18, wherein the lip portion has spatial dimensions, the spatial dimensions of the lip portion varying within substantially the standard, corresponding, factory-run tolerances for cut, fuzed quartz, selected from the group comprising perpendicularity, concentricity, roundness, diameter, runout, flatness, and wall thickness.

20. The apparatus of claim 19, wherein the force provides a pressure between the lip portion and the header face that is substantially unequal about a circumference thereof.

21. The apparatus of claim 20, wherein the pressure between the lip portion and the header face varies circumferentially by an order of magnitude between a first region along the circumference and a second region along the circumference.

22. The apparatus of claim 14, wherein the sealant is loaded only by the lip portion and the header face, exclusive of the fluid; and the conduit and header provide substantially only washed surfaces to the fluid.

23. The apparatus of claim 1, wherein the conduit forms a heating tube for conducting heat into the fluid contained in the conduit by convection and conduction.

24. An apparatus for sealing connections between ultra-pure, non-reactive conduits, the apparatus comprising:

a conduit comprising a wall having a wall thickness and a wall center, the wall being formed of a high purity, non-reactive material for conducting a fluid maintained in a highly purified condition;

a sealant, formed of a first creeping material positioned to extend between the conduit and a header and to extend from a position inside the conduit to an ambient external to the conduit, the creeping sealant being free to creep toward a joint region between the conduit and the header in response to pressure of the fluid in the conduit;

the header being formed of a second creeping material for exchanging the fluid with the conduit;

a frame for supporting a force applied between the header and the conduit through the creeping sealant;

a tensioner connecting between the frame and the header for maintaining the force above a sealing value; and the first and second creeping materials being formed by heat-accelerated primary creep to remain subject to substantially secondary creep and elasticity, the elasticity and secondary creep being of a same order of magnitude.

25. An apparatus for sealing connections between ultra-pure, non-reactive conduits, the apparatus comprising:

a conduit comprising a wall having a wall thickness and a wall center, the wall being formed of a high purity, non-reactive material for conducting a fluid maintained in a highly purified condition;

a header formed of a high purity, non-reactive, polymeric material for exchanging the fluid with the conduit;

a creeping sealant, formed of a first creeping material containing fibrils limiting creep therein proximate the wall center and maintaining a connection between an inner portion of the creeping sealant and an outer portion of the creeping sealant, the creeping sealant being positioned to extend between the conduit and the header and to extend from a position inside the conduit to an ambient external to the conduit, and the creeping sealant being free to creep toward a joint region between the conduit and the header in response to pressure of the fluid in the conduit;

a frame for supporting a force applied between the header and the conduit through the creeping sealant; and a tensioner connecting between the frame and the header for maintaining the force above a sealing value.

* * * * *

UNITED STATES PATENT AND TRADEMARK OFFICE

CERTIFICATE OF CORRECTION

PATENT NO. : 5,971,402
DATED : October 26, 1999
INVENTOR(S) : Northrop et al.

It is certified that error appears in the above-identified patent and that said Letters Patent is hereby corrected as shown below:

In column 3, line 2, please change "perbillion" to --per-billion--.

We also request to add our list of references to the Letters Patent.

References Cited as follows:

4,427,378 1/1984 Bowers 432/242
4,469,338 9/1984 Legris 277/236
4,630,669 12/1986 Kessler et al. 165/169
4,645,648 2/1987 Gongora et al. 422/186
4,877,270 10/1989 Phillips 285/18
5,516,159 5/1996 Hirakawa et al. 285/388
5,722,668 3/1998 Rice et al. 277/650
5,868,437 2/1999 Teague 285/45
5,870,526 2/1999 Aschner et al. 392/416
5,590,240 12/1996 Rezabek 392/483
5,559,924 9/1996 Kadotani et al. 392/483
5,271,086 12/1993 Kamiyama et al. 392/483
5,054,107 10/1991 Batchelder 392/483

Signed and Sealed this

Fifth Day of December, 2000

*Attest:*

Q. TODD DICKINSON

*Attesting Officer* *Director of Patents and Trademarks*